(12) United States Patent
Takabe et al.

(10) Patent No.: US 6,244,967 B1
(45) Date of Patent: Jun. 12, 2001

(54) CONSTANT VELOCITY JOINT WITH RESIN BOOT

(75) Inventors: Shinichi Takabe, Iwata; Kenji Terada, Shizouka-ken, both of (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/158,512

(22) Filed: Sep. 22, 1998

(30) Foreign Application Priority Data

Sep. 30, 1997 (JP) .................................................... 9-266427

(51) Int. Cl.⁷ ....................................................... F16C 1/26
(52) U.S. Cl. ............................................. 464/175; 24/20 R
(58) Field of Search ................................... 464/173, 175; 24/20 R, 20 CW, 20 W; 277/636; 403/50, 51; 285/236

(56) References Cited

U.S. PATENT DOCUMENTS

| | | | |
|---|---|---|---|
| 4,000,341 | * 12/1976 | Matson | 428/36.9 |
| 4,395,245 | * 7/1983 | Carlson | 464/173 X |
| 4,701,982 | 10/1987 | Matsuno et al. | |
| 4,730,834 | * 3/1988 | Ukai et al. | 277/636 |
| 5,044,814 | * 9/1991 | Hama | 24/20 R |
| 5,078,652 | * 1/1992 | Baker | 464/175 |
| 5,339,505 | * 8/1994 | Hama et al. | |
| 5,692,962 | * 12/1997 | Fukumura et al. | 464/173 |
| 5,725,433 | * 3/1998 | Kudo et al. | 464/175 |

FOREIGN PATENT DOCUMENTS

| | | |
|---|---|---|
| 0 545 629 A2 | 6/1993 | (EP) . |
| 7-280092 | 10/1995 | (JP) . |
| 9-254917 | * 9/1997 | (JP) . |

* cited by examiner

*Primary Examiner*—Lynne H. Browne
*Assistant Examiner*—Greg Binda
(74) *Attorney, Agent, or Firm*—Arent Fox Kintner Plotkin & Kahn (57) ABSTRACT

The boot fixing portion 2a is fitted on the outer peripheral surface 1a3 of the boot attaching portion 1a2, the positioning of the two being made such that the convex portion 2a2 is fitted in the engaging groove 1a4. Then the boot band 3 fitted in the band mounting groove 2a3 is reduced in diameter by folding back the lever member 3b, thereby clamping the boot fixing portion 2a to the boot attaching portion 1a2. Thereupon, the clamping force exerted by the boot band 3 causes elastic deformation of the boot fixing portion 2a, displacing the convex portion 2a2 toward the engaging groove 1a4, so that the projections 1a5 bite into the inner peripheral surface 2a1 of the boot fixing portion 2a.

14 Claims, 11 Drawing Sheets

FIG. 6 the wall thickness of the ridges (mm)
(the peripheral minium value - maximum value)

| 1st | 2nd | 3rd | 4th | 5th | 6th |
|-----|-----|-----|-----|-----|-----|
| 0.70-1.10 | 0.60-0.90 | 0.70-1.00 | 0.70-1.00 | 0.70-1.10 | 0.70-1.10 |
| $T_1=0.9$ | $T_2=0.75$ | $T_3=0.85$ | $T_4=0.85$ | $T_5=0.9$ | $T_6=0.9$ |

($T_1, T_2, \ldots, T_6$ : the peripheral average wall thickness)

the wall thickness of the troughs (mm)
(the peripheral minium value - maximum value)

| 1st | 2nd | 3rd | 4th | 5th |
|-----|-----|-----|-----|-----|
| 0.80-1.10 | 0.80-1.10 | 0.80-1.10 | 1.05-1.35 | 0.90-1.20 |
| $t_1=0.95$ | $t_2=0.95$ | $t_3=0.95$ | $t_4=1.2$ | $t_5=1.05$ |

($t_1, t_2, \ldots, t_6$ : the peripheral average wall thickness)

CONSTANT VELOCITY JOINT WITH RESIN BOOT

BACKGROUND OF THE INVENTION

The present invention relates to a constant velocity joint having a fixing construction wherein a bellows-like resin boot is fixed at boot attaching portions by boot bands.

Constant velocity joints have a boot mounted thereon in order to prevent leakage of grease sealed in the joint and entry of foreign matter into the joint. Such boot is clamped and fixed at a boot attaching portion of an outer joint member and at a boot attaching portion of a shaft portion of the constant velocity joint by boot bands, respectively. As for such constant velocity joint boots, rubber boots made of rubber, such as chloroprene rubber (CR), and resin boots made of resin material are in common use. In recent years, however, there has been a tendency for resin boots to be used more frequently from the viewpoint of rotational expansion resistance and durability.

Figure 14:
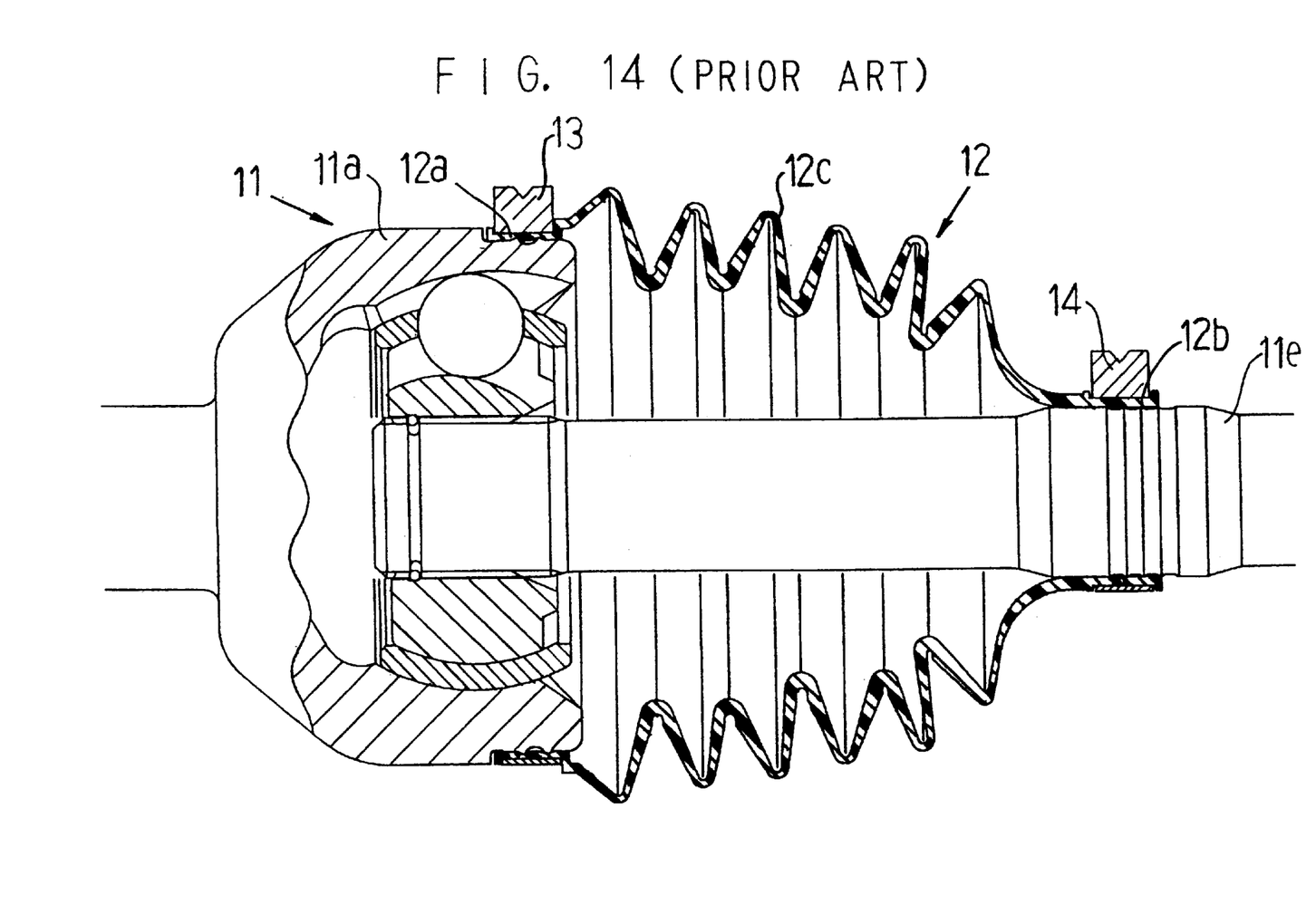
FIG. 14 is a longitudinal section showing a conventional constant velocity joint which has a resin boot mounted thereon.

FIG. 14 shows a constant velocity joint 11 having a conventional bellows-like resin boot 12 mounted thereon. The resin boot 12 has cylindrical boot fixing portions 12a and 12b on the larger and smaller diameter sides with a bellows portion 12c disposed therebetween. The boot fixing portion 12a on the larger diameter side is clamped and fixed at a boot attaching portion of an outer joint member 11a by a boot band 13 and the boot fixing portion 12b on the smaller diameter side is clamped and fixed at a boot attaching portion of a shaft portion lie by a boot band 14.

A resin boot, as compared with a rubber boot, has a high hardness, lacking in elasticity; therefore, in order to secure a sufficient fixing strength and sealability it is common practice to use, as boot bands, crimp type bands (omega bands) 13 and 14 having clamp portions of omega ($\Omega$) shape which provide a greater clamping force. The reason why the omega bands have been used for the conventional resin boots is that such a boot band as so-called lever type boot band (a band of the type adapted to clamp by folding back a lever member), which is conventionally used for rubber boots, has failed to provide a sufficient clamping force if they used with the conventional resin boots.

The omega bands 13 and 14, as compared with the lever type boot band and the like, is capable of providing a large clamping force. On the other hand, it has disadvantages in design; for example, since it has a form in which a clamp portion projects radially outward, its maximum radius of rotation is so large as to require a large space to avoid interference with the peripheral parts. Further, since the clamp portion is projecting, its chance of encountering foreign substances (such as flying stones) increases. Further, the band itself is complicated in shape, and requires a greater wall thickness and a greater width than those of boot bands used for rubber boots; thus, it is disadvantageous also from the viewpoint of cost. On the other hand, some of the boot bands have no projecting clamp portion, however, if they are applied to resin boots, it has been difficult to secure a sufficient fixing strength and sealability.

SUMMARY OF THE INVENTION

An object of the present invention is to provide a fixing construction which has no projecting clamp portion and is capable of securing a sufficient fixing strength and sealability for resin boots.

To achieve the object, the invention uses the so-called lever type boot band having no projecting clamp band portion as a boot band for clamping at least one of boot fixing portions of a resin boot and thereby fixing it to boot attaching portion of a constant velocity joint. That is, to use such a boot band that comprises, a band member of band-like metal material, the band member being bended in annular shape and having a joined portion in which opposite ends of the band member are joined together in a state of inner surfaces thereof met each other, and a lever member of metal material having higher rigidity than that of the band member, the lever member being attached to one outer surface of the joined portion of the band member. The lever member is folded back by making use of leverage to clamp the boot fixing portion, and then the lever member is placed on and fixed to an outer surface of the band member. This boot band is simple in construction and has no projecting clamp portion, so that it is advantageous from the viewpoint of design and cost. Further, since the chances of encountering foreign substances are low, a stabilized fixed state can be maintained.

Further, in order to secure a sufficient fixing strength and sealability, the invention uses the following technical means.

(1) The resin boot was made of a thermoplastic polyester type elastomer whose hardness was such that $38 \leq H_D < 50$, preferably $41 \leq H \leq 47$, for example $H_D = 47$. Thereby, as compared with the conventional resin boot (conventionally, $H_D$ is 50 or above), the material hardness is reduced and the pliability is improved, and simultaneously, the stresses (tension and compression) during bending produced in the troughs are reduced and the bending fatigue resistance of the troughs are improved. Herein, "$H_D$" indicates the D scale of the Shore hardness (based on ASTM).

(2) The average wall thickness T of each ridge of the bellows portion of the resin boot was such that $0.5 \text{ mm} \leq T \leq 1.5$ mm, the average wall thickness t of each trough was such that $0.5 \text{ mm} \leq t \leq 1.5$ mm, the wall thickness ratio r (=t/T) of the trough to the ridge in each pair which consists of adjoining ridge and trough was such that $1.0 \leq r < 1.5$, the maximum value Tmax of the average wall thickness T of the ridges was related to its minimum value Tmin such that $Tmax \leq 1.5$ Tmin, and the maximum value tmax of the average wall thickness t of the troughs was related to its minimum value tmin such that $tmax \leq 1.5$ tmin. By setting the wall thickness ratio r (=t/T) in the above range, as compared with the conventional resin boot (conventionally, the t/T=1.5–2.1), the elasticity of the troughs with respect to the ridges is increased (since the wall thickness is relatively decreased), the stresses (tensile and compressive) in the troughs are decreased, and the bending fatigue resistance of the troughs is improved. Further, by setting the maximum value of the average wall thickness for both the ridges and the troughs at not more than 1.5 times the minimum value, the compression produced when the joint is attached is distributed with good balance over each trough, so that there is no inflection point formed in the (compressive load)-(amount of axial compression) diagram.

(3) In accordance with the constructions in the above paragraphs (1) and (2), it is possible, while securing a durability which is equal to or greater than the durability of the conventional resin boot, to attain compact-sizing (reduction of the outer diameter, reduction of the axial length). The reduction of the material hardness of the resin boot (improvement in pliability) and compact-sizing through reduced wall-thickness will work advantageously in securing fixing strength and sealability for constant velocity joints.

(4) The wall thickness S3 of the boot fixing portion of the resin boot was such that $1 \text{ mm} \leq S3 \leq 1.8$ mm and the calculated clamp interference $\delta$ defined below was such that $0 < \delta \leq 1.6$ mm:

$$\delta = \{\phi A + (2 \times S3)\} - \phi D$$

where

φD: calculated clamping inner diameter of boot band:

φA: maximum outer diameter of boot attaching portion

S3: wall thickness of boot fixing portion (wall thickness prior to application of clamping force).

During the clamping of the boot band, a slight amount of elongation is produced in the band member by the clamping force. The diameter φD is the clamping inner diameter calculated by neglecting the elongation of the band member, etc., produced during the clamping. The diameter φA is the outer diameter of the top surface of the projection (see FIGS. 2 through 4) when such projection is provided on the boot attaching portion. Also, φA is the outer diameter of the outer peripheral surface of the boot attaching portion when the projection is not provided. The S3 is the wall thickness before a clamping force is imparted, i.e., the wall thickness when the boot fixing portion is in its natural state.

Although the calculated clamping interference δ could take a value in the vicinity of zero according to operating conditions, it is preferably is such that $\delta \geq 0.5$ mm in order to secure a sufficient fixing strength and sealability. If, however, δ is too large, there is a possibility of the band member buckling and the fixing strength and sealability lowering; therefore, it should be such that $\delta \geq 1.6$ mm. The results of test showed that in each of the cases of a combination of low temperature, high angle and low speed rotation and another combination of ordinary temperature, high angle and medium speed rotation, good sealability was observed when the calculated clamping interference δ was 0.2 mm, 0.5 mm, 1.0 mm, and 1.6 mm, but a lack of sealability was observed when δ=0 mm.

(5) The wall thickness S1 of the band member of the boot band was such that $0.3 \text{ mm} \leq S1 \leq 0.6$ mm and the width W1 was such that $8 \text{ mm} \leq W1 \leq 12$ mm. If the wall thickness S1 of the band member is less than 0.3 mm, it is difficult to obtain the required clamping force. On the other hand, if the wall thickness S1 of the band member exceeds 0.6 mm, the rigidity of the band member is too high, making it difficult to fold back the lever member, and decreasing the advantages in outer diameter and material cost. Accordingly, the dimension was set such that $0.3 \text{ mm} \leq S1 \leq 0.6$ mm. The wall thickness S1 of the band member is considerably small (approximately equal to the wall thickness of the boot band for rubber boots) as compared with the conventional boot band for resin boots (the wall thickness of the band member is generally about 1.0 mm). The principal reason why the use of such thin-walled band member is made possible is that the improvement in the elasticity of the material of resin boots and the reduction in the size of resin boots reduce the torsional rigidity and centrifugal expansion when the boot is rotating, so that it becomes possible to secure a sufficient fixing strength and sealability using a small clamping force as compared with the conventional resin boot.

The reason for setting the width W1 of the band member in the manner described above is as follows.

If the width W1 of the band member is less than 8 mm, the clamping force available is insufficient. On the other hand, if the width W1 of the band member exceeds 12 mm, either there is no difference observed in the clamping effect or even if such difference is more or less observed, the advantage in material cost decreases. Accordingly, the dimension was set such that $8 \text{ mm} \leq W1 \leq 12$ mm.

(6) The wall thickness S2 of the lever member was set with respect to the wall thickness S1 of the band member such that $2.5 \leq (S2/S1) \leq 3.5$ and the width W2 was set equal to the width W1 of the band member. If (S2/S1) is less than 2.5, the required clamping strength cannot be obtained, and when the clamping interference is increased, there is a possibility that buckling deformation occurs in the lever member. On the other hand, if (S2/S1) exceeds 3.5, either there is no difference observed in the clamping effect or even if such difference is more or less observed, the advantages in outer diameter dimension and material cost decreases. Further, a surface hardening treatment, such as barrel finishing or shot blasting, may be applied to the surface of the lever member. By improving the surface hardness of the lever member, the strength of the lever member against buckling deformation can be increased.

(7) The inner peripheral surface of the boot fixing portion of the resin boot was formed with an annular convex portion adapted to engage an annular engaging groove formed in the outer peripheral surface of the boot attaching portion. Further, the opposite sides of the engaging groove of the boot attaching portion were formed with projections. During clamping, the boot fixing portion has an elastic deformation produced therein owing to the clamping force of the boot band, the convex portion being displaced into engagement with the engaging groove, the projections biting into the inner peripheral surface of the boot fixing portion. Owing to this engagement between the convex portion and the engaging groove, and the powerful biting of the projections, the boot fixing portion is fixed to the outer peripheral surface of the boot attaching surface with a high degree of slip-off preventive strength and sealability. Further, the inner peripheral surface of the boot fixing portion contacts the outer peripheral surface of the boot attaching portion to a suitable degree, providing good sealability.

(8) When the lever member of the boot band is folded back, a portion of the band member is folded back by the fold-back point of the lever member, the joined portion assuming a position to overlap the outer surface of the lever member. As a result, there is a partial clearance formed in the portion adjoining the fold-back portion of the band member (the portion on the side opposite to the fold-back direction of the lever member), in which portion a lowering of the sealability tends to occur. Accordingly, a protuberance is formed on the inner surface of the band member, the protuberance being brought into contact with the outer peripheral portion of the boot fixing portion of the resin boot to fill said clearance, thereby making it possible to further improve the sealability. At least one such protuberance is formed preferably in the position where it comes close to the fold-back portion of the band member when the lever member is folded back. Further, the protuberance is suitably designed as to its shape, size and position of formation, and the circumferential clearance γ between the end surface of the protuberance and the fold-back portion of the band member is set such that $0 < \gamma \leq 1.5$ an, thereby providing improved sealability. Further, by making the width of the protuberance smaller than that of the engaging groove of the boot attaching portion and pressing the boot fixing portion toward the engaging groove by means of the protuberance, higher sealability can be obtained.

According to the invention, a boot band having no projecting clamp portion can be applied to a resin boot, and a sufficient fixing strength and sealability can be secured. As a result, the degree of freedom of design is improved owing to the reduction of the maximum radius of rotation, the stability and reliability of the clamped state are improved owing to the reduction of the chance of encountering foreign substances, and the cost can be reduced owing to the simplification of the shape of the band itself, etc.

BRIEF DESCRIPTION OF THE DRAWINGS

FIG. 9($a$) is a side view of a boot band,

FIG. 9($b$) is a sectional view of a lever member, and

FIG. 9($c$) is a sectional view of a band member;

FIG. 10($a$) is a side view showing the lever member of the boot band in its folded-back state, and FIGS. 10($b$) and ($c$) are sectional views showing by way of example a clasp;

FIGS. 11($a$) and ($b$) are sectional views showing a state in which the boot fixing portion on the larger diameter side is clamped by a boot band and thereby fixed to the boot attaching portion of the outer joint member;

DESCRIPTION OF THE PREFERRED EMBODIMENTS

Embodiments of the invention will now be described with reference to the drawings.

Figure 1:
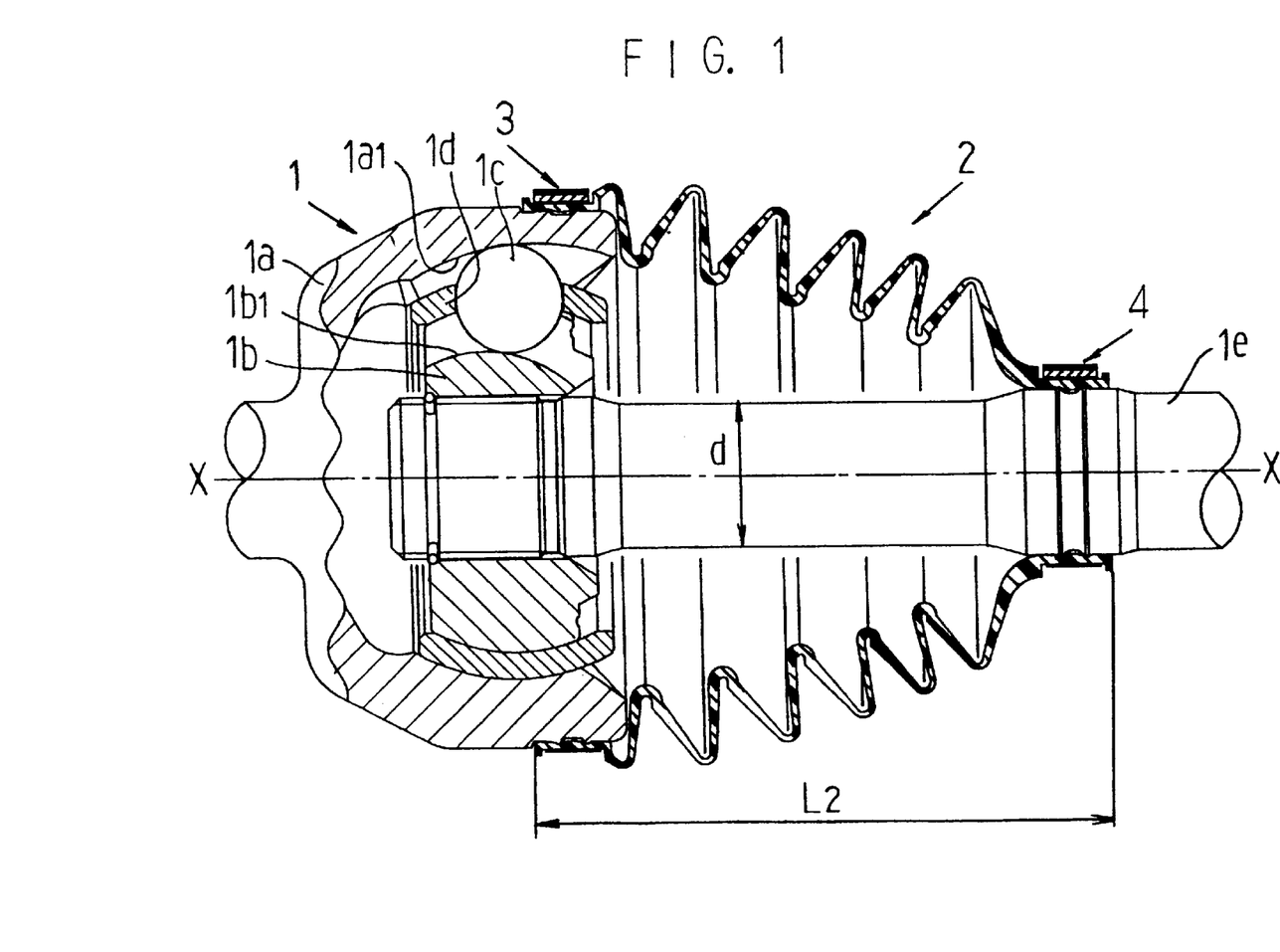
FIG. 1 is a longitudinal section showing a resin boot attached to a constant velocity joint.

FIG. 1 shows a state in which a resin boot 2 fixed on a constant velocity joint 1 by boot bands 3 and 4. The constant velocity joint 1 comprises an outer joint member 1$a$ having a plurality of axially extending guide grooves 1$a$1 formed in the inner peripheral surface thereof, an inner joint member 1$b$ having a plurality of axially extending guide grooves 1$b$1 formed in the outer peripheral surface thereof, a plurality of balls 1$c$ disposed in ball tracks defined by cooperation between the guide grooves 1$a$1 and 1$b$1, a cage id for holding the balls 1$c$, and a shaft portion 1$e$ serration-connected (or spline-connected) to the inner periphery of the inner joint member 1$b$. The resin boot 2 is fixed to the outer joint member 1$a$ and the shaft portion 1$e$.

Figure 2:
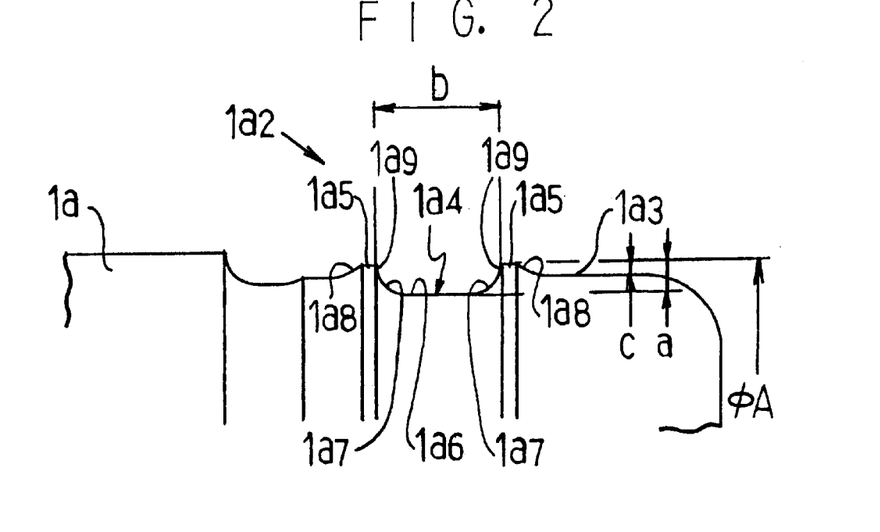
FIG. 2 is a side view showing the boot attaching portion of an outer joint member.

FIG. 2 shows a boot attaching portion 1$a$2 of the outer joint member 1$a$. The boot attaching portion 1$a$2 is usually provided on the outer peripheral surface of the end on the open side of the outer joint member 1$a$. The outer peripheral surface 1$a$3 of the boot attaching portion 1$a$2 is formed with an annular engaging groove 1$a$4, and annular projections 1$a$5 are formed on opposite sides of the engaging groove 1$a$4. The engaging groove 1$a$4 is shaped such that the middle portion is a flat surface 1$a$6 parallel with the axis, said flat surface 1$a$6 extending through an arcuate surface 1$a$7 having a radius of curvature R to the second side 1$a$9 of each projection 1$a$5. The first side 1$a$8 of the projection 1$a$5 is an inclined wall, and the second side 1$a$9 is a vertical wall orthogonal to the axis.

Figure 3:
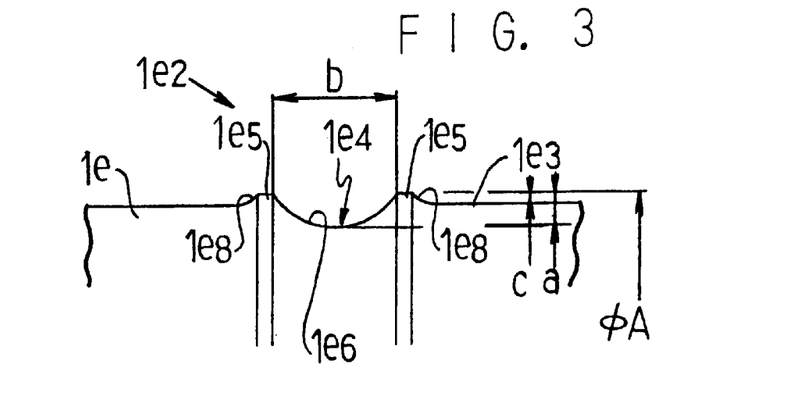
FIG. 3 is a side view showing the boot attaching portion of a shaft portion.

FIG. 3 shows the boot attaching portion 1$e$2 of the shaft portion 1$e$. The outer peripheral surface 1$e$3 of the boot attaching portion 1$e$2 is formed with an annular engaging groove 1$e$4 and annular projections 1$e$5 are formed on opposite sides of the engaging groove 1$e$4. The engaging groove 1$e$4 and the second sides of the projections 1$e$5 are described by a single arcuate surface 1$e$6 having a radius of curvature R'. The first side 1$e$8 of the projection 1$e$5 is an inclined wall.

Figure 4:
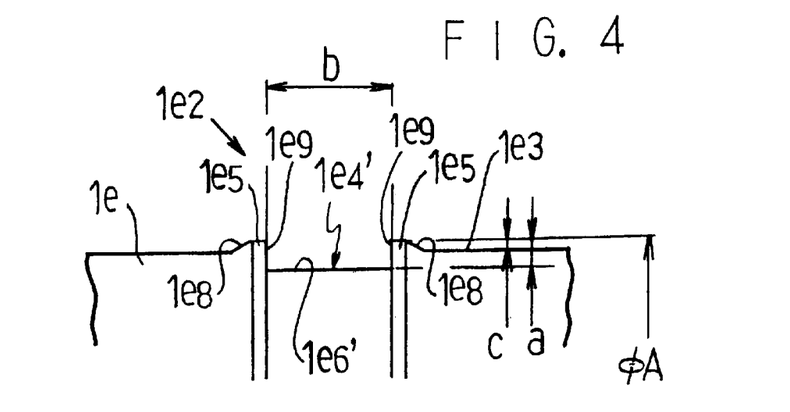
FIG. 4 is a side view showing the boot attaching portion of a shaft portion.

FIG. 4 shows an engaging groove 1$e$4' of another shape in the boot attaching portion 1$e$2. This engaging groove 1$e$4' is shaped such that the entire groove bottom is a flat surface 1$e$6' parallel with the axis, a said flat surface 1$e$6' extending through the vertical wall to the second side 1$a$9 of the projection 1$e$5. The first side 1$e$8 of the projection 1$e$5 is an inclined wall and the second side 1$e$9 is a vertical wall orthogonal to the axis.

In addition, the engaging groove of the boot attaching portion 1$a$2 of the outer joint member 1$a$ may be shaped as shown in FIG. 3 or 4, and the engaging groove of the boot attaching portion 1$e$2 of the shaft portion 1$e$ may be shaped as shown in FIG. 2. Further, $\phi$A in FIGS. 2 through 4 indicates the maximum outer diameter of the boot attaching portion. In these boot attaching portions, since the projections are formed on opposite sides of the engaging groove, the outer diameter of the top surface of the projection is the maximum outer diameter $\phi$A of the boot attaching portion.

In this embodiment, in order to increase the processibility, fixing strength and sealability of the boot attaching portion, dimensional relations are established between the height f (see FIGS. 7 and 8) of the convex portion of the boot fixing portion to be later described, the depth a and width b of the engaging groove of the boot attaching portion shown in FIGS. 2 through 4, and the height c of the projections, such that $$0.2 \text{ mm} \leq c \leq 0.5 \text{ mm},\ 0.5 \text{ mm} \leq a \leq 1.5 \text{ mm},\ f \leq (a-c)\ (b/a) \geq 3.$$

The setting of the dimension 0.2 mm $\leq$ c $\leq$ 0.5 mm is based on the following reason.

If the height c of the projections is less than 0.2 mm, the inner peripheral surface of the boot fixing portion strongly contacts the outer peripheral surface of the boot attaching portion during clamping, so that the projections cannot be expected to bite sufficiently into the boot fixing portion. On the other hand, if the height c of the projections exceeds 0.5 mm, the diameter of the boot attaching portion has to be increased, extending to an increase in material cost and processing cost, and incurring the possibility of a clearance being defined between the inner peripheral surface of the boot fixing portion and the outer peripheral surface of the boot attaching portion during clamping to lower the sealability.

The setting of the dimension 0.5 mm $\leq$ a $\leq$ 1.5 mm is based on the following reason.

If the depth a of the engaging groove exceeds 1.5 mm, the strength of the boot attaching portion lowers and the profile machining of the engaging groove becomes difficult to effect, a fact which is disadvantageous from the viewpoint of manufacturing cost and processibility. On the other hand, if the depth a is less than 0.5 mm, the convex portion contacts the bottom of the engaging groove and is elastically deformed, lowering the biting ability of the projections by an amount corresponding to the reaction due to the deformation. As a result, the height f of the convex portion has to be inevitably decreased correspondingly thereto, and the effect of the fixing of the position in the engaging groove by the convex portion lowers.

Further, the relation between the depth a of the engaging groove and the height f of the convex portion should be such that the convex portion does not contact the bottom of the engaging groove during clamping or such that even if it contacts said bottom, this does not affect the biting ability of the projections. This relation also has to do with the height c of the projections and the boot material. In finding an optimum dimensional relation between the height f of the convex portion, the depth a of the engaging groove and the height c of the projections by considering these factors, there has been obtained the relation: $f \leq (a-c)$.

The setting of the dimension $(b/a) \geq 3$ is intended to give the engaging groove a shape which allows profile machining thereof to improve the processibility and reduce the manufacturing cost. If $(b/a) < 3$, then common profile machining is impossible.

The effects obtained by the setting of the dimensions described above will more or less vary according to the shapes of the engaging groove and projections of the boot attaching portion. When the biting ability into the boot fixing portion of projections of various shapes shown in FIGS. 2 through 4 is taken into consideration, the projections shown in FIGS. 2 and 4 have a better biting ability than the projections shown in FIG. 3. The reason is that the projections shown in FIGS. 2 and 4 have their second sides shaped as vertical walls. The second sides strongly engage the inner peripheral surface or convex portion of the boot fixing portion and resist the force which tends to axially displace the boot fixing portion; thus, a high slip-off preventive strength is obtained. However, in the shape of the engaging groove shown in FIG. 4, a problem of processibility sometimes arises. With the biting ability, strength and processibility taken into consideration, preferable is the engaging groove $1a4$ shaped as shown in FIG. 2, and a more preferable form of this engaging groove $1a4$ is obtained by a dimensional setting such that $0.1 \text{ mm} \leq R \leq a$ where R is the radius of curvature of the arcuate surface $1a7$. If the radius of curvature R is less than 0.1 mm, the strength and processibility degrade though the biting ability increases. On the other hand, if the radius of curvature R exceeds the depth a, the biting ability degrades though the strength and processibility improve.

Figure 5:
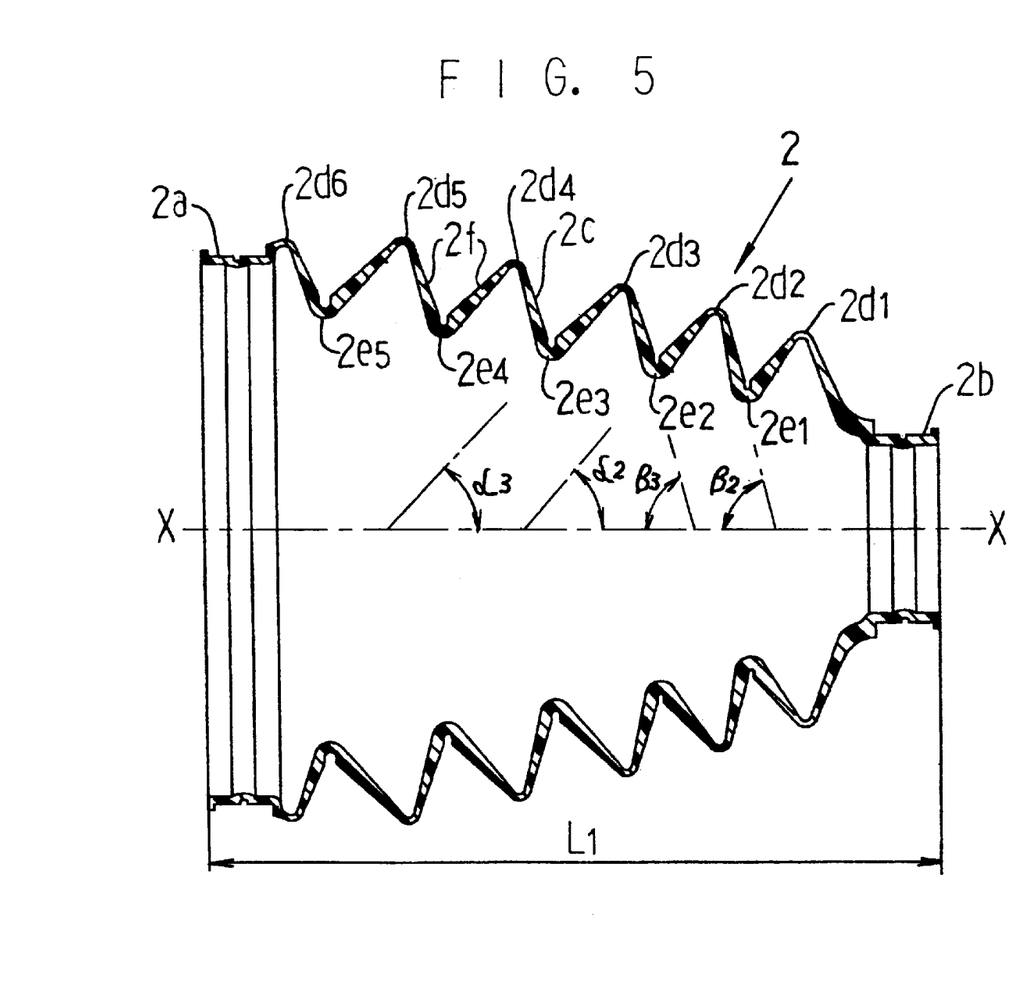
FIG. 5 is a longitudinal section showing the natural state of a resin boot.

FIG. 5 shows the resin boot 2 in its natural state. This resin boot 2 is formed of thermoplastic polyester type elastomer (TPEE) having a hardness $H_D$ such that $38 \leq H_D < 50$, preferably $41 \leq H_D \leq 47$, for example, $H_D = 47$, and comprises a boot fixing portion $2a$ on the larger diameter side adapted to be clamped and fixed on the boot attaching portion $1a2$ of the outer joint member $1a$ by a boot band 3, a boot fixing portion $2b$ on the smaller diameter side adapted to be clamped and fixed on the boot attaching portion $1e2$ of the shaft portion $1e$ by a boot band 4, and a bellows portion $2c$ which connects the boot fixing portions $2a$ and $2b$.

The bellows portion $2c$ comprises six ridges $2d$ ($2d1$, $2d2$, ..., $2d6$, as seen from the smaller diameter side), five troughs $2e$ ($2e1$, $2e2$, ..., $2e5$, as seen from the smaller diameter side), and inclined portions $2f$ which connect the ridges $2d$ and troughs $2e$. The first ridge $2d1$ is $(2.7 \times d)$ in diameter where d is the diameter of the shaft portion $1e$, and the fifth ridge $2d5$ is $(4 \times d)$ in diameter, the bellows portion being substantially conical, with the diameter gradually decreasing from larger diameter side to smaller diameter side. Therefore, this resin boot 2 is considerably compact in size both radially and axially as compared with the conventional resin boot and is about 24% smaller than in the prior art as compared with the natural length L1 is compared. Further, when this resin boot 2 is attached to the constant velocity joint 1, it is in a state in which it is somewhat compressed with respect to the natural length L1 {percentage compression $(L1-L2)/L1 \times 100$ is about 20%, whereas the percentage compression of the conventional resin boot is about 23–26%}. The attached length L2 is about 16% smaller than in the prior art, being the same as that of a rubber (CR) boot. In addition, the number of ridges of the bellows portion may be optionally selected within the range of 4–7.

Figure 6:
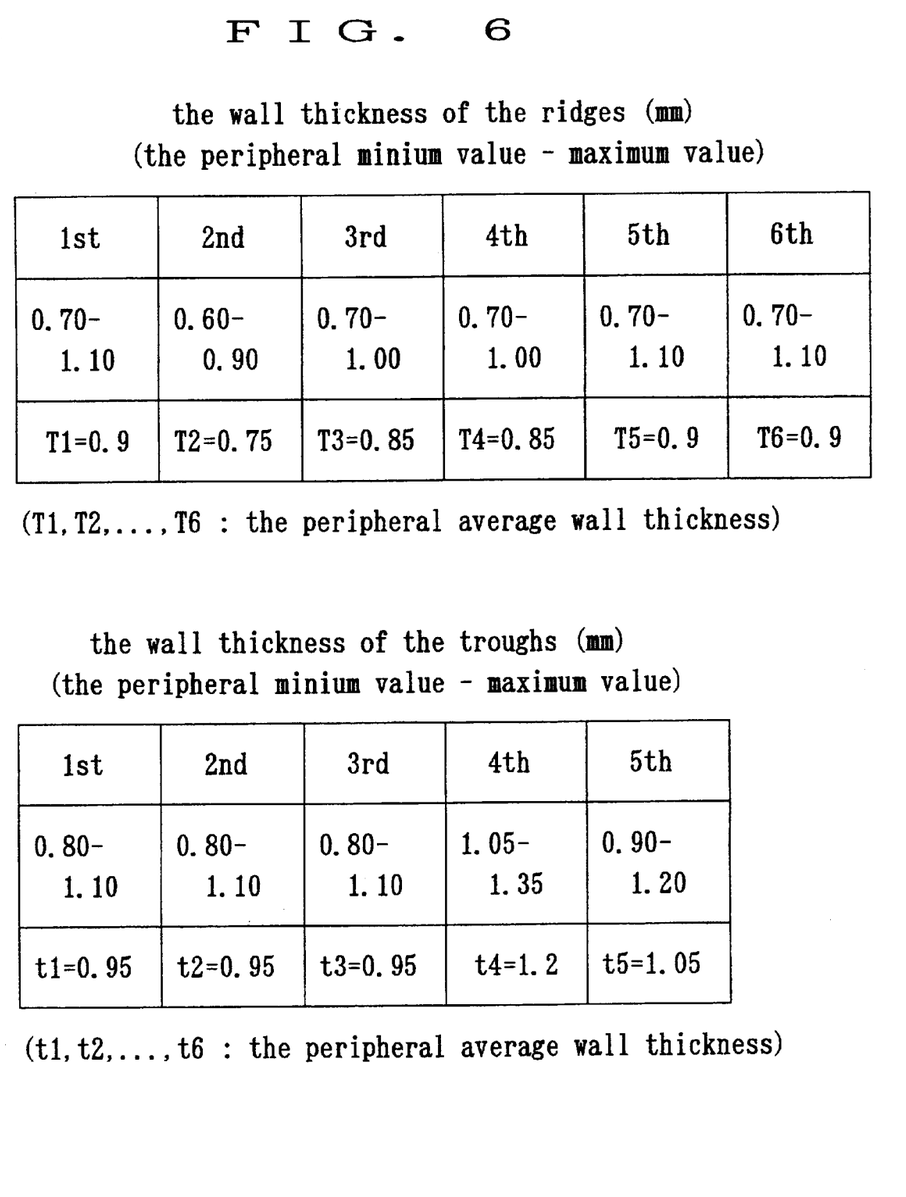
FIG. 6 is a table showing an example of the setting of the wall thickness of the ridges and troughs of the resin boot.

As shown by way of example in FIG. 6, the average wall thickness $T(T1, T2, \ldots, T6)$ of the respective ridges $2d$ is such that $0.5 \text{ mm} \leq T \leq 1.5 \text{ mm}$, preferably $0.5 \text{ mm} \leq T \leq 1.1 \text{ mm}$, the average wall thickness $t(t1, t2, \ldots, t5)$ of the respective troughs $2e$ is such that $0.5 \text{ mm} \leq t \leq 1.5 \text{ mm}$, and the wall thickness ratio $r(=t/T)$ of the trough $2d$ to the ridge $2e$ in each pair which consists of adjoining ridge and trough is within the range of $1.0 \leq r(t/T) < 1.5$. The concrete ranges of the wall thickness ratio r are as follows.

```
r1 = t1/T1 = 1.05                    r2 = t1/T2 = 1.26
r3 = t2/T2 = 1.26                    r4 = t2/T3 = 1.11
r5 = t3/T3 = 1.11                    r6 = t3/T4 = 1.11
r7 = t4/T4 = 1.41                    r8 = t4/T5 = 1.33
r9 = t5/T5 = 1.16                    r10 = t5/T6 = 1.16
∴ 1.0 = ≤ r1, r2, •••, r10 < 1.5
Tmax = 0.9                           tmax = 1.2
Tmin = 0.75                          tmin = 0.95.
```

In this connection, since the conventional resin boot is 0.55–2.1 mm in the thickness of the ridges and troughs and $1.5 \leq rt \leq 2.1$ in the wall thickness ratio r, this resin boot 2, as compared with the conventional boot, is decreased as a whole in the wall thickness of the ridges $2d$ and troughs $2e$ and is relatively decreased in the wall thickness of the troughs $2e$ with respect to the ridges $2d$. Further, in this resin boot 2, the average wall thicknesses T of all ridges $2d$ are substantially the same ($T_{max} \leq 1.5 \times T_{min}$ suffices) and the average wall thicknesses t of all troughs $2e$ are substantially the same ($t_{max} \leq 1.5 \times t_{min}$ suffices). In addition, the reason why the average wall thicknesses T and t are used as the references is that there is some variation circumferentially in the wall thickness since generally used as the molding method for resin boots, unlike the one for CR boots, is the blow molding (for CR boots, injection molding is generally used; the blow molding uses an outer mold alone, with no inner mold).

Further, the angle of inclination $\alpha(\alpha1, \alpha2, \ldots, \alpha5$ as seen from the smaller diameter side) which the inclined portion $2f$ extending from the ridge $2d$ to the trough $2e$ on the large diameter side forms with the centerline X of the boot shaft is smaller than the angle $\beta(\beta1, \beta2, \ldots, \beta6$, as seen from the smaller end side) of the inclined portion $2f$ extending from the ridge $2d$ to the trough $2e$ on the smaller diameter side. It is preferable that $\alpha1, \alpha2, \ldots, \alpha5$ be 38°–45° and that $\beta1, \beta2, \ldots, \beta6$ be 1.3–1.6 times (or –1.8 times) the $\alpha$.

Figure 7:
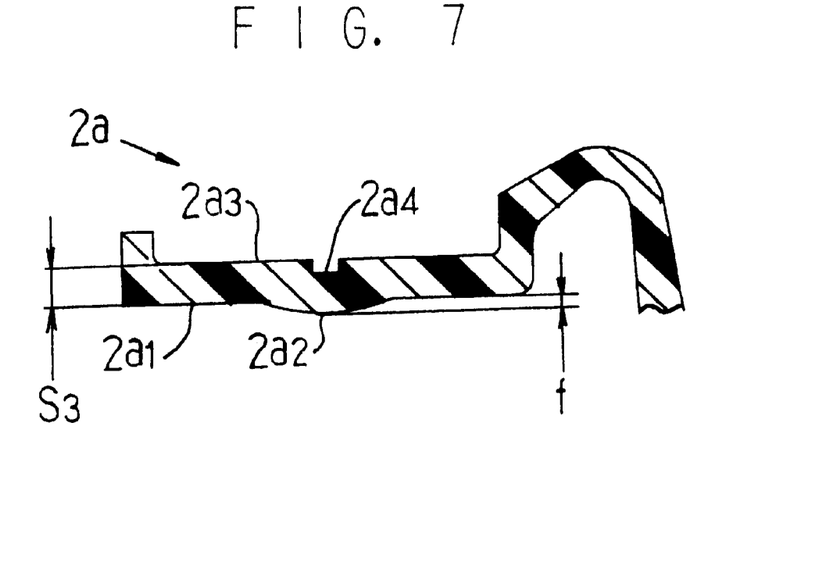
FIG. 7 is a sectional view showing the boot fixing portion on the larger diameter side.

FIG. 7 shows the boot fixing portion $2a$ on the larger diameter side. The boot fixing portion $2a$ is formed on its inner peripheral surface $2a1$ with an annular convex portion 2a2 integral therewith and on its outer peripheral surface with an annular band mounting groove 2a3. The wall thickness S3 of the boot fixing portion 2a is set in the range of 1 mm≦S3≦1.8 mm on the basis of the reference described above. The height of the convex portion 2a2 as measured from the inner peripheral surface 2a1 is f. Further, the central portion of the band mounting groove 2a3 is formed with an annular groove 2a4.

Figure 8:
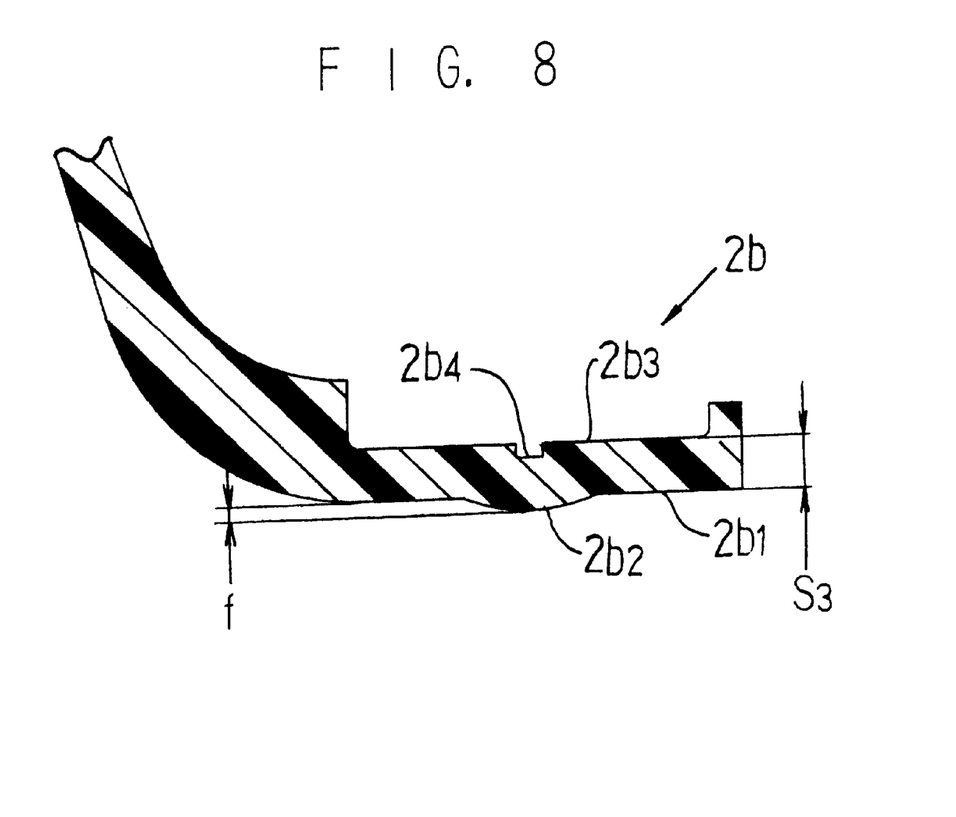
FIG. 8 is a sectional view showing the boot fixing portion on the smaller diameter side.

FIG. 8 shows the boot fixing portion 2b on the smaller diameter side. The boot fixing portion 2b is formed on its inner peripheral surface 2b1 with an annular convex portion 2b2 integral therewith and on its outer peripheral surface with an annular band mounting groove 2b3. The wall thickness S3 of the boot fixing portion 2b is set in the range of 1 mm≦S3≦1.8 mm on the basis of the reference described above. The height of the convex portion 2b2 as measured from the inner peripheral surface 2b1 is f. Further, the central portion of the band mounting groove 2b3 is formed with an annular groove 2b4.

As described above, this resin boot 2, as compared with the conventional resin boot, has a low material hardness and is thin-walled as whole and compact in size both radially and axially. Further, since the wall-thickness and the wall-thickness ratio of the ridges 2d and troughs 2e are set on the basis of the references described above, the bending fatigue resistance of the troughs 2e is high and furthermore the compression load during attachment is absorbed in a well-balanced manner by the troughs 2e and the troughs 2e are compressed in a well-balanced manner; thus, there is no inflection point formed in the (compressive load)-(amount of axial compression) diagram. Therefore, this resin boot 2 exhibits durability which is as great as or greater than that of the conventional resin boot regardless of the fact that it has substantially the same compact shape as the rubber (CR) boot.

Reduction of the material hardness (improvement in pliability) and compact-sizing through reduced wall-thickness in the resin boot act advantageously for securement of fixing strength and sealability for the constant velocity joint. That is, improvement in the pliability of material makes it possible for a small force to be enough for sufficient clamping. Further, compact-shaping of boot shape reduces the amount of grease present in the bellows portion. And since the influence of centrifugal force is reduced, the force acting on the boot fixing portion is reduced. During the rotation of the constant velocity joint, the sealed-in grease is axially pushed out and this pushing force causes a phenomenon in which the grease present in the bellows portion flows axially. Owing to the axially directed hydrodynamic pressure of this grease, the fixing portion receives a tensile or compressive force through the bellows portion. Particularly, at cryogenic temperature, the elasticity of the boot lowers and at the same time so does the consistency of the grease; therefore, a large force acts on the boot fixing portion. Further, as the rotary speed increases, the grease flows radially outward under the action of centrifugal force, said radially outward flow of the grease causing the boot fixing portion to receive a tensile force through the bellows portion. The boot is made compact in size, and the amount of grease present in the bellows is reduced. Further, the influence of centrifugal force also is reduced, so that such force is reduced. Further, the reduction of material hardness (improvement in pliability) coupled with the influence of the thin-wall and compact-sizing reduces the torsional rigidity of the boot. Therefore, the omega band which makers have heretofore been compelled to use for attaching resin boots can be replaced by the following boot band having no projecting clamp portion, thereby making it possible to secure a sufficient fixing strength and sealability.

Figure 9A:
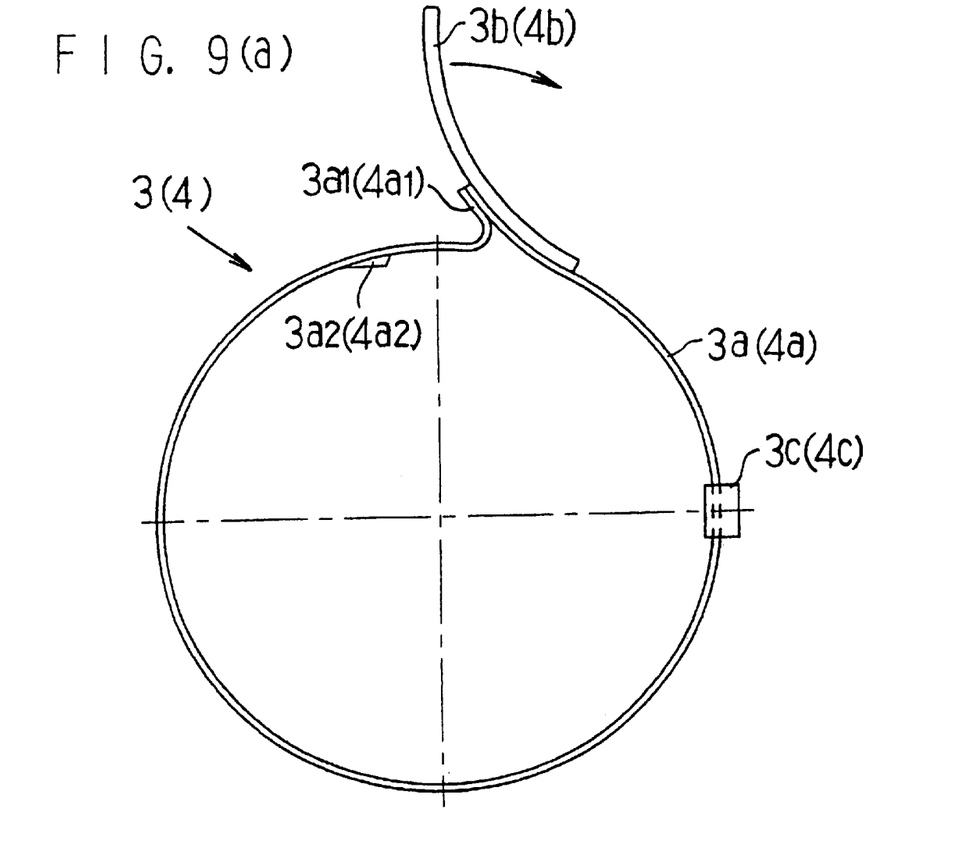
Figure 9B:
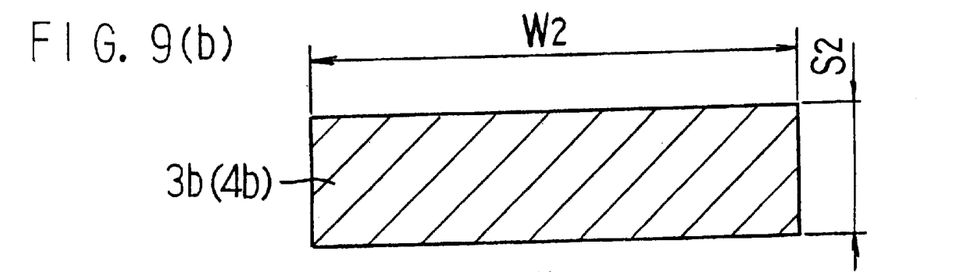
Figure 9C:
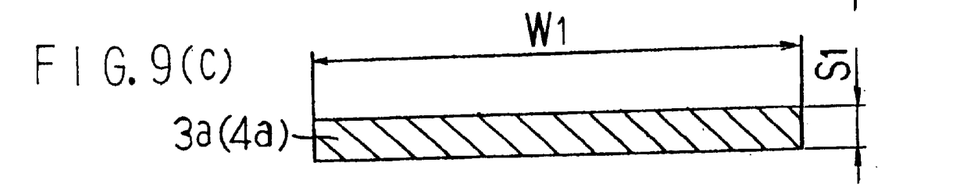

FIG. 9 shows a boot band 3 (4) mounted on the boot fixing portion 2a (2b) of a resin boot 2. The boot band 3 (4) is formed by annularly bending a band member 3a (4a) made of a strip-like metal material, joining the opposite ends thereof together as if palm to palm, and fixing a lever member 3b (4b) made of rigid metal greater in thickness than the band member 3a (4a) to one outer surface of the joined portion 3a1 (4a1). The band member 3a (4a) and the lever member 3b (4b) are made, for example, of stainless steel, and the wall-thickness S1 and width W1 of the band member 3a (4a) and wall-thickness S2 and width W2 of the lever member 3b (4b) shown in FIGS. 9(b) and (c) are set as follows on the basis of the references described above.

Wall-thickness S1 of band member: 0.3 mm≦S1≦0.6 mm

Width W1 of band member: 8 mm≦W1≦12 mm

Wall-thickness of S2 of lever member: 2.5≦(S2/S1)≦3.5

Width W2 of lever member: W2=W1

Further, the lever member 3b (4b) has barrel finishing applied thereto to remove burrs and edges which form during processing and to improve the surface hardness thereof. Further, barrel finishing may be replaced by shot blasting or shot peening. Further, the inner surface of the band member 3a (4a) is formed with a protuberance 3a2 (4a2). This protuberance 3a2 (4a2) is formed, for example, by inwardly bending the required region of the band member 3a (4a). Such protuberance may be formed separately from the band member and then fixed to the required region of the inner surface of the band member.

The lever member preferably has a bending rigidity such that when the lever member is supported at two points spaced a distance L of 36 mm and has a concentrated load of M (such that 5 kg≦M≦25 kg) applied thereto at the center (L/2) thereof, the amount of deflection y at the center (L/2) is 0.5 mm.

Figure 10A:
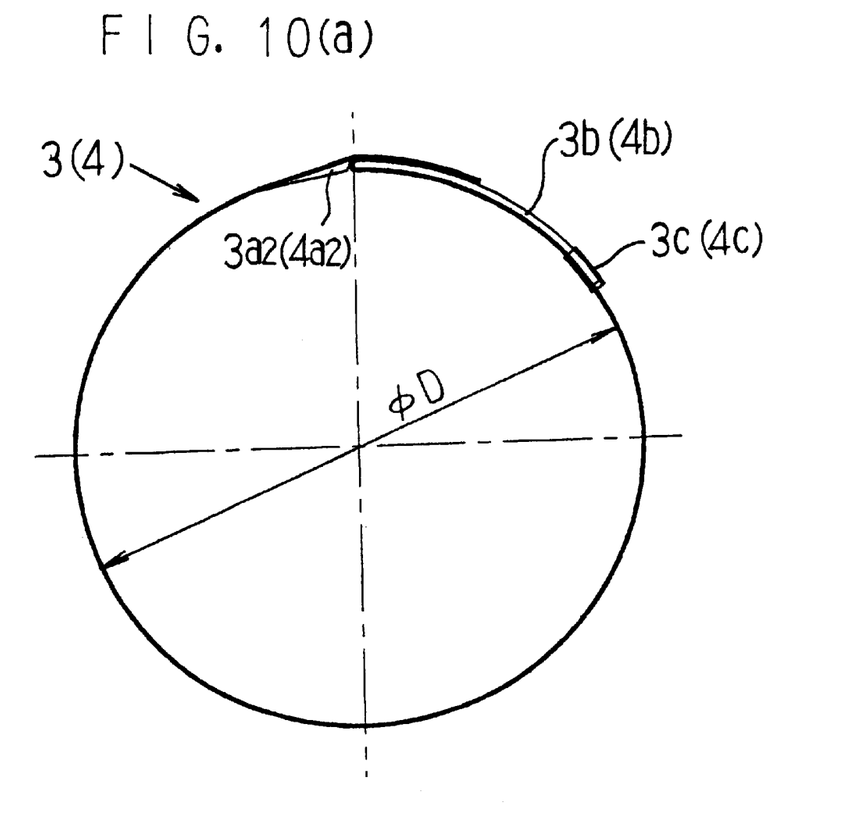
Figure 10B:
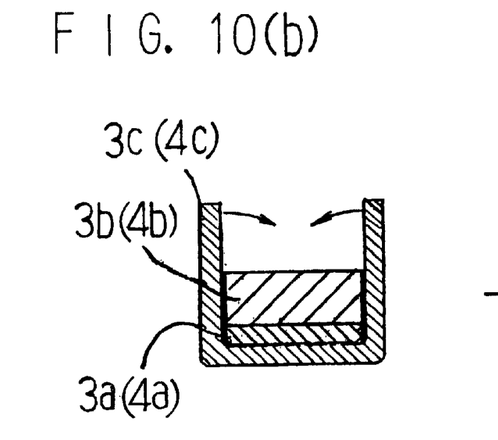
Figure 10C:
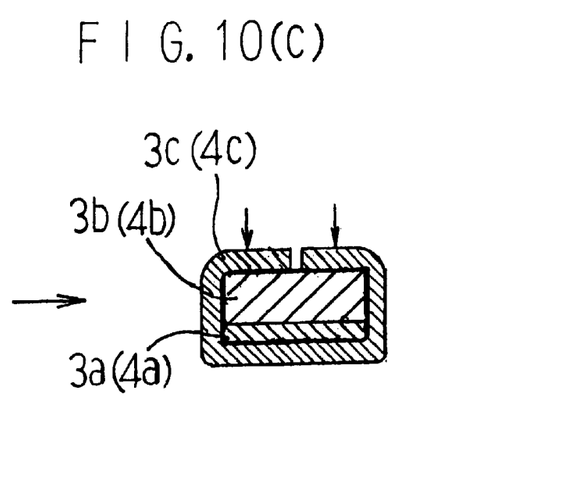

In clamping the boot fixing portion 2a (2b), the lever member 3b (4b) is forcibly folded back by making use of leverage and then placed on the outer surface of the band member 3a (4a) and fixed in position by a clasp 3c (4c), as shown in FIG. 10. Folding back the lever member 3b (4b) reduces the annular portion of the band member 3a (4a) in diameter (the calculated clamping inner diameter being ɸD) and imparts a required tightening force (clamping force)to the boot fixing portion 2a (2b). The clasp 3c (4c) is, for example, as shown in FIGS. 10(b) and (c), a U-shaped metal strip fixed on a predetermined region of the band member 3a (4a). When the lever member 3b (4b) is to be fixed in the predetermined region, the opposite sides thereof is beaten to be bent to overlie the outer surface of the lever member 3b (4b). in addition, the clasp is not limited to the form shown and a clasp of different construction may be substituted. Further, as the fixing means for the lever member, use may be made of fixing means, such as spot welding, instead of the clasp.

Figure 11A:
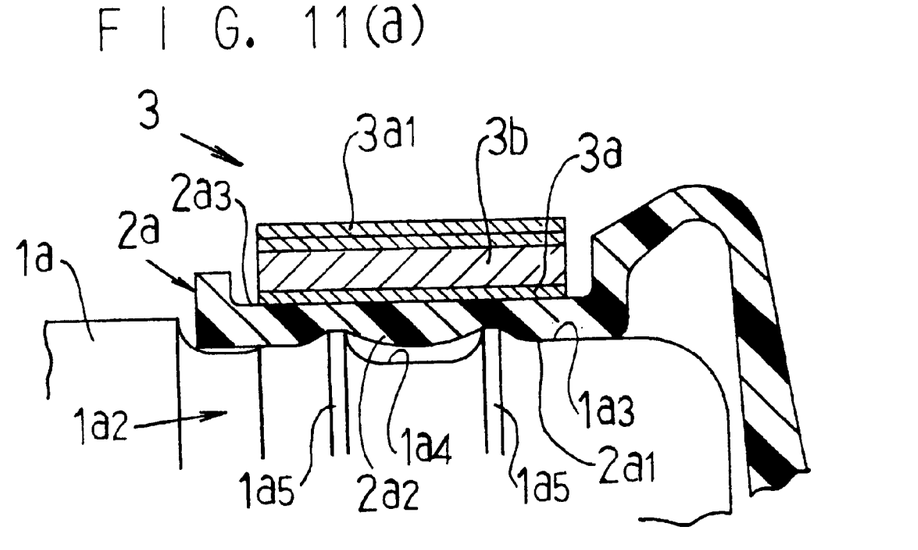
Figure 11B:
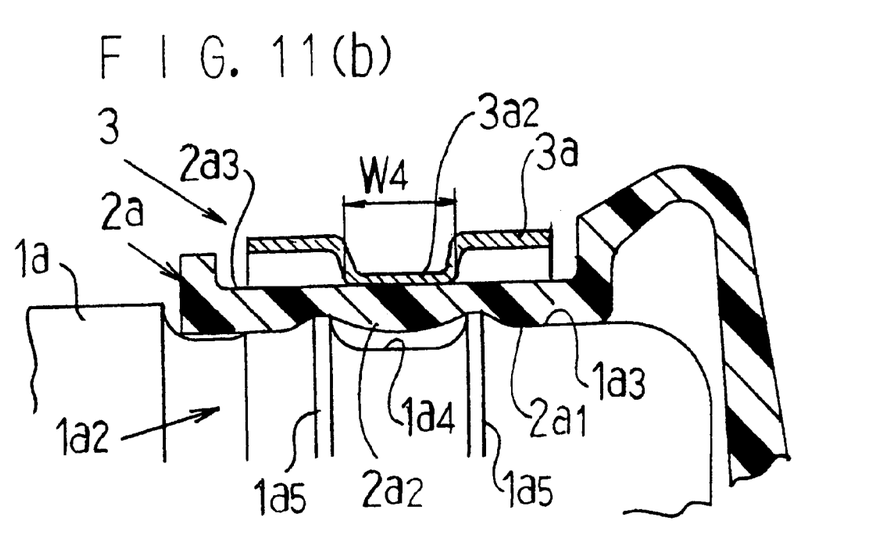
Figure 12:
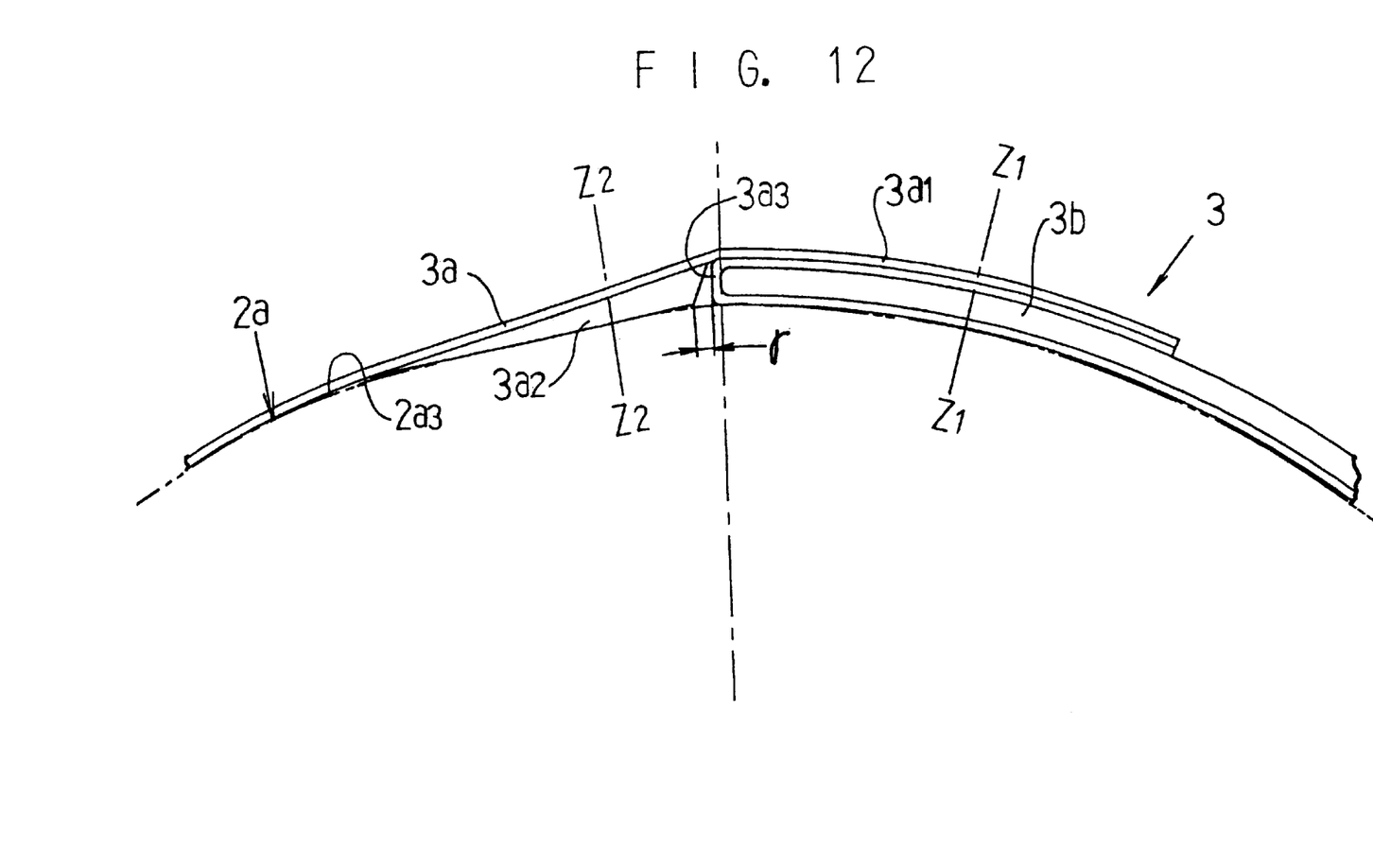
FIG. 12 is a sectional view showing a state in which the boot fixing portion on the larger diameter side is clamped by a boot band and thereby fixed to the boot attaching portion of an outer joint member.

FIGS. 11 and 12 show a state in which the boot fixing portion 2a on the larger diameter side of the resin boot 2 is clamped and fixed to the boot attaching portion 1a2 of the outer joint member 1 by the boot band 3. FIG. 11(a) is a sectional view taken along the line Z1—Z1 in FIG. 12 and FIG. 11(b) is a sectional view taken along the line Z2—Z2 in FIG. 12. The boot fixing portion 2a is fitted on the outer peripheral surface 1a3 of the boot attaching portion 1a2, the positioning of the two being made such that the convex portion 2a2 is fitted in the engaging groove 1a4. Then the boot band 3 fitted in the band mounting groove 2a3 is reduced in diameter by folding back the lever member 3b, thereby clamping the boot fixing portion 2a to the boot attaching portion 1a2. Thereupon, the clasping force exerted by the boot band 3 causes elastic deformation of the boot fixing portion 2a, displacing the convex portion 2a2 toward the engaging groove 1a4, so that the projections 1a5 bite into the inner peripheral surface 2a1 of the boot fixing portion 2a. Thanks to this engagement between the convex portion 2a2 and the engaging groove 1a4 and the firm biting of the projections 1a5, the boot fixing portion 2a is fixed on the boot attaching portion 1a2 with high slip-off preventive strength and sealability. Further, the inner peripheral surface 2a1 of the boot fixing portion 2a contact the outer peripheral surface 1a3 of the boot attaching portion 1a2 to a suitable degree, thus providing satisfactory sealability.

In order to secure satisfactory fixing strength and sealability of the boot fixing portion 2a, the calculated clamping interference δ expressed by the following relation should be in the range of 0<δ≦1.6 mm on the basis of the references described above.

$$\delta = \{\phi A + (2 \times S3)\} - \phi D$$

φD: calculated clamping inner diameter of boot band (see FIG. 10)

φA: maximum outer diameter of boot attaching portion (see FIGS. 2 through 4)

S3: wall-thickness of boot fixing portion (wall-thickness prior to application of clamping force: see FIG. 7)

As shown in FIG. 12, when the lever member 3b is folded back, a portion 3a3 of the band member 3a is folded back at the fold-back point of the lever 3b, so that the joined portion 3a1 overlies the outer surface of the lever member 3b. Therefore, a local clearance forms in the portion adjacent the fold-back portion 3a3 of the band member 3a (the portion on the side opposite to the fold-back direction of the lever member 3b) and a lower of sealability is liable to occur in said portion. Accordingly, in this embodiment, a protuberance 3a2 is provided on the inner surface of the band member 3a and is brought into contact with the outer peripheral surface (band groove 2a3) of the boot fixing portion 2a, thus filling up said clearance to further improving sealability. Such protuberances 3a2 are provided in one or more positions, preferably including one which comes close to the fold-back portion 3a3 of the band member 3a when the lever member 3b is folded back. Further, by most suitably determining the shape, size and position of formation of the protuberance 3a2 to ensure that the maximum value of the circumferential clearance γ between the end surface of the protuberance 3a2 and the fold-back portion 3a3 of the band member 3a is such that 0<γ≦1.5 mm, a state more desirable for the improvement of sealability is established. Further, as shown in FIG. 11(b), the width W4 of the protuberance 3a2 is made smaller than the width b of the engaging groove 1a4 of the boot attaching portion 1a2 (see FIG. 2); thus, during clamping, the boot fixing portion 2a is pressed toward the engaging groove 1a4 by the protuberance 3a2, whereby higher sealability can be obtained.

Figure 13:
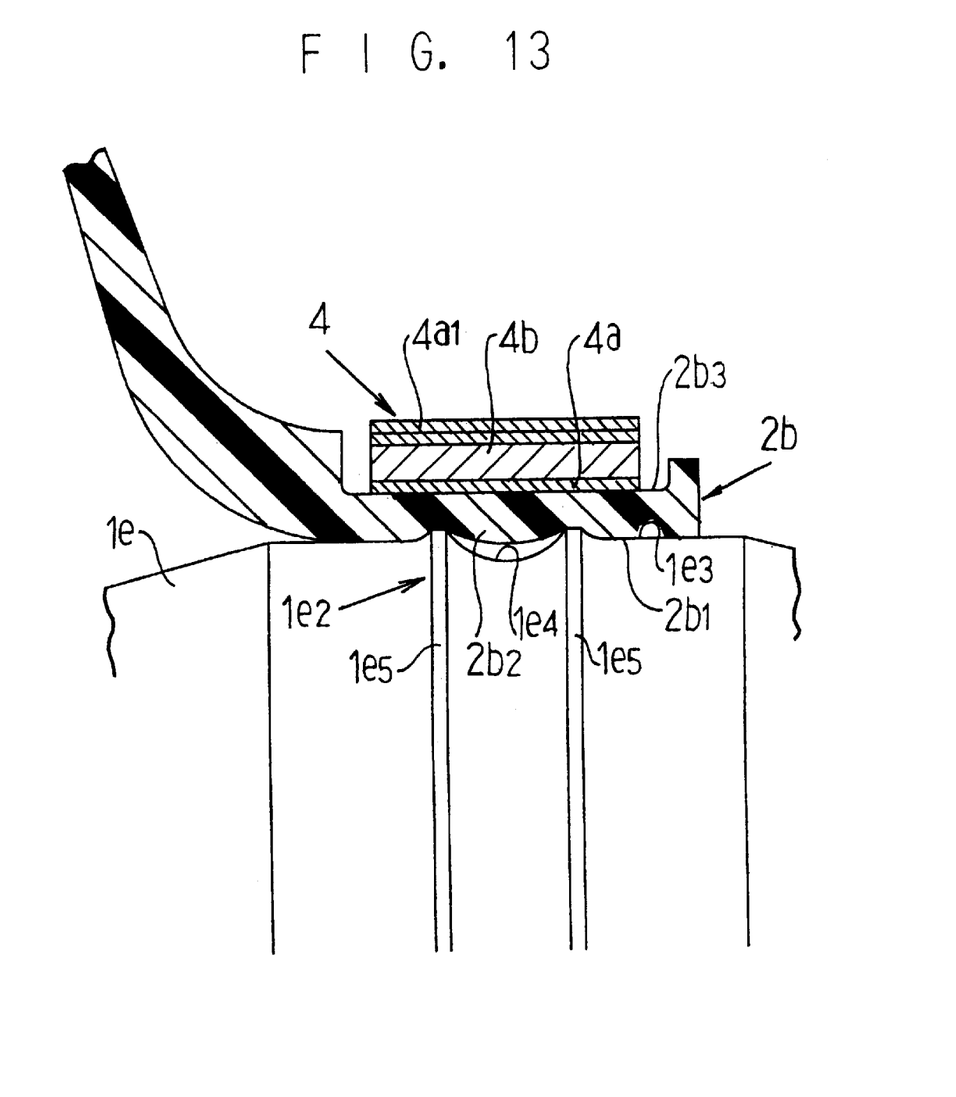
FIG. 13 is a sectional view showing a state in which the boot fixing portion on the smaller diameter side is clamped by a boot band and thereby fixed to the boot attaching portion of a shaft portion.

FIG. 13 show a state in which the boot fixing portion 2b on the smaller diameter side is clamped and fixed on the boot attaching portion 1e2 of the shaft portion 1e by the boot band 4. Its fixing construction is basically the same as the fixing construction for the larger diameter side described above, so that a repetitive description thereof is omitted.

In addition, the fixing construction described so far may be applied to only one of the larger and smaller diameter sides.

What is claimed is:

1. A constant velocity universal joint, comprising: a resin boot fixed in position in such a manner that cylindrical boot fixing portions formed at opposite ends of the resin boot with a bellows portion defined by a series of ridges, pleats and troughs and interposed therebetween are fitted on boot attaching portions of the joint and clamped by boot bands mounted on outer peripheral surfaces of the boot fixing portions and thereby fixed on the boot attaching portions, wherein the boot band mounted on at least one of the boot fixing portions of the resin boot comprises a band member of a band-like metal material, the band member being bent in an annular shape and having a joined portion in which opposite ends of the band member are joined together in a state of inner surfaces thereof meeting each other, and a lever member of a metal material, the lever member having higher rigidity than that of the band member, the lever member being attached to one outer surface of the joined portion of the band member, wherein the lever member is folded back by making use of leverage to clamp the boot fixing portion, and then the lever member is placed on and fixed to an outer surface of the band member, and wherein the resin boot is fabricated from an elastomer having a hardness $H_D$ on a D scale of Shore hardness as follows:

$$H_D 38 \leq H_D < H_D 50.$$

2. A constant velocity universal joint as set forth in claim 1, wherein the resin boot is made of a thermoplastic polyester type elastomer, the wall-thickness S3 of the boot fixing portion being such that 1 mm≦S3≦1.8 mm, and the calculated clamp interference δ defined below is such that 0<δ≦1.6 mm:

$$\delta = \{\phi A + (2 \times S3)\} - \phi D$$

φD: calculated clamping inner diameter of boot band in mm

φA: maximum outer diameter of boot attaching portion in mm

S3: wall-thickness of boot fixing portion
prior to application of clamping force.

3. A constant velocity universal joint as set forth in claim 2, wherein the average wall thickness T of each ridge of the bellows portion of the resin boot is such that 0.5 mm≦T≦1.5 mm , the average wall thickness t of each trough is such that 0.5 mm≦t≦1.5 mm, the wall thickness ratio r (=t/T) of the trough to the ridge in each pair which consists of adjoining ridge and trough is such that 1.0≦r≦1.5, the maximum value Tmax of the average wall thickness T of the ridges is related to its minimum value Tmin such that Tmax≦1.5 Tmin, and the maximum value tmax of the average wall thickness t of the troughs is related to its minimum value tmin such that tmax≦1.5 tmin.

4. A constant velocity universal joint as set forth in claim 1, 2 or 3, wherein the wall thickness S1 of the band member of the boot band is such that 0.3 mm≦S1≦0.6 mm and the width W1 of the band member is such that 8 mm≦W1≦12 mm.

5. A constant velocity universal joint as set forth in claim 4, wherein the wall thickness S2 of the lever member of the boot band is set with respect to the wall thickness S1 of the band member such that 2.5≦(S2/S1)≦3.5 and the width W2 of the lever member is set equal to the width W1 of the band member.

6. A constant velocity universal joint as set forth in claim 5, wherein the lever member of the boot band has a surface hardening treatment applied to a surface thereof.

7. A constant velocity universal joint as set forth in claim 1, 2 or 3, wherein an inner peripheral surface of the boot fixing portion of the resin boot is formed with an annular convex portion adapted to engage an annular engaging groove formed in an outer peripheral surface of the boot attaching portion.

8. A constant velocity universal joint as set forth in claim 7, wherein opposite sides of the engaging groove are formed with projections.

9. A constant velocity universal joint as set forth in claim 1, 2 or 3, wherein a protuberance is formed on an inner surface of the band member of the boot band, the protuberance being brought into contact with the outer peripheral surface of the boot fixing portion of the resin boot to prevent formation of a local clearance between the inner surface of the band member and the outer peripheral surface of the boot fixing portion.

10. A constant velocity universal joint as set forth in claim 9, wherein the protuberance is formed in the position where it comes close to a fold-back portion of the band member when the lever member is folded back.

11. A constant velocity universal joint as set forth in claim 10, wherein circumferential clearance $\gamma$ between an end surface of the protuberance and the fold-back portion of the band member is set such that $0<\gamma\leq15$ mm.

12. A constant velocity universal joint as set forth in claim 11, wherein the width of the protuberance is smaller than that of the engaging groove of the boot attaching portion.

13. A constant velocity universal joint as set forth in claim 10, wherein the width of the protuberance is smaller than that of the engaging groove of the boot attaching portion.

14. A constant velocity universal joint as set forth in claim 9, wherein the width of the protuberance is smaller than that of the engaging groove of the boot attaching portion.

* * * * *